(12) United States Patent
Yao et al.

(10) Patent No.: US 11,675,441 B1
(45) Date of Patent: Jun. 13, 2023

(54) INFORMATION PROCESSING APPARATUS AND CONTROL METHOD

(71) Applicant: Lenovo (Singapore) Pte. Ltd., Singapore (SG)

(72) Inventors: Qiang Yao, Kanagawa (JP); Kyosuke Abe, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/933,485

(22) Filed: Sep. 20, 2022

(30) Foreign Application Priority Data

Jan. 17, 2022 (JP) .............................. JP2022-004915

(51) Int. Cl.
*G06F 3/03* (2006.01)
*G06F 3/038* (2013.01)
*G06F 3/0354* (2013.01)

(52) U.S. Cl.
CPC ............ *G06F 3/0321* (2013.01); *G06F 3/038* (2013.01); *G06F 3/03545* (2013.01)

(58) Field of Classification Search
CPC ..... G06F 3/0321; G06F 3/03545; G06F 3/038
See application file for complete search history.

(56) References Cited

U.S. PATENT DOCUMENTS 9,529,525 B2    12/2016    Skaljak et al.
2015/0062021 A1*    3/2015    Skaljak .................. G06F 3/038
                                                                                    345/173

* cited by examiner

*Primary Examiner* — Jonathan A Boyd
(74) *Attorney, Agent, or Firm* — Osha Bergman Watanabe & Burton LLP

(57) ABSTRACT

A display having a touchscreen is coupled to a processor that acquires a plurality of first detection positions on the touchscreen at a predetermined detection interval by an operation medium, calculates a predictive position indicative of a predicted subsequent position of the operation medium based on the plurality of first detection positions, corrects the predictive position based on a plurality of second detection positions and a weighting value, the plurality of second detection positions being a subset of the plurality of first detection positions selected at an interval greater than the predetermined detection interval, the weighting value being based on an angle between at least latest three detection positions among the plurality of second detection positions, and displays, on the display, a trajectory line including the plurality of first detection positions and the corrected predictive position.

7 Claims, 7 Drawing Sheets

| RANGE OF L | CLASSIFICATION | WEIGHTING VALUE W |
|---|---|---|
| $-1 \leq L < L1$ | ALMOST STRAIGHT | $W=0$ |
| $L1 \leq L < L2$ | MIDDLE CURVE | $W=W1$ |
| $L2 \leq L < L3$ | MODERATELY SHARP CURVE | $W=W2$ |
| $L3 \leq L < L4$ | SHARP CURVE | $W=W3$ |
| $L4 \leq L$ | IRREGULAR CASE | PERFORM NO PREDICTION |

INFORMATION PROCESSING APPARATUS AND CONTROL METHOD

CROSS-REFERENCE TO RELATED APPLICATIONS

This application claims priority to Japanese Patent Application No. 2022-4915 filed on Jan. 17, 2022, the contents of which are hereby incorporated herein by reference in their entirety.

TECHNICAL FIELD

The present disclosure relates to an information processing apparatus and a control method.

BACKGROUND

An information processing apparatus, such as a tablet terminal or a personal computer, may include an input device for handwriting input.

SUMMARY

In one aspect of the present disclosure, a computer includes a display having a touchscreen, and a processor coupled to the display, the processor being programmed to acquire a plurality of first detection positions on the touchscreen at a predetermined detection interval, each of the plurality of first detection positions corresponding to a respective touch operation on the touchscreen by an operation medium, calculate a predictive position indicative of a predicted subsequent position of the operation medium based on the plurality of first detection positions, correct the predictive position based on a plurality of second detection positions and a weighting value, the plurality of second detection positions being a subset of the plurality of first detection positions selected at an interval greater than the predetermined detection interval, the weighting value being based on an angle between at least latest three detection positions among the plurality of second detection positions, and display, on the display, a trajectory line including the plurality of first detection positions and the corrected predictive position.

According to another aspect of the present disclosure, an apparatus includes a display unit, a touch sensor unit placed on a screen of the display unit to detect a touch with an object on the screen, an acquisition processing unit which acquires plural pieces of first detection position data on the screen detected by the touch sensor unit at predetermined detection intervals as a result of touching of an operation medium on the screen; a prediction processing unit which generates predictive position data indicative of a predictive movement position of the operation medium, where the prediction processing unit executes prediction processing for generating the predictive position data indicative of the predictive movement position of the operation medium based on a predetermined number of second detection position data obtained by thinning out the plural pieces of first detection position data at two or more data intervals, selection processing for selecting a correction weighting value according to a correction index value based on a cosine value of an angle having, as a vertex, the second point of at least the latest three points among the predetermined number of second detection position data, and correction processing for correcting the predictive position data based on the predetermined number of second detection position data including the latest three points and the weighting value, and a display processing unit which displays, on the display unit, a movement trajectory on the screen as a result of touching and moving of the operation medium on the screen based on the first detection position data and the predictive position data output by the prediction processing unit.

DETAILED DESCRIPTION

An information processing apparatus and a control method according to embodiments of the present disclosure will be described below with reference to the accompanying drawings.

First Embodiment

Figure 1:
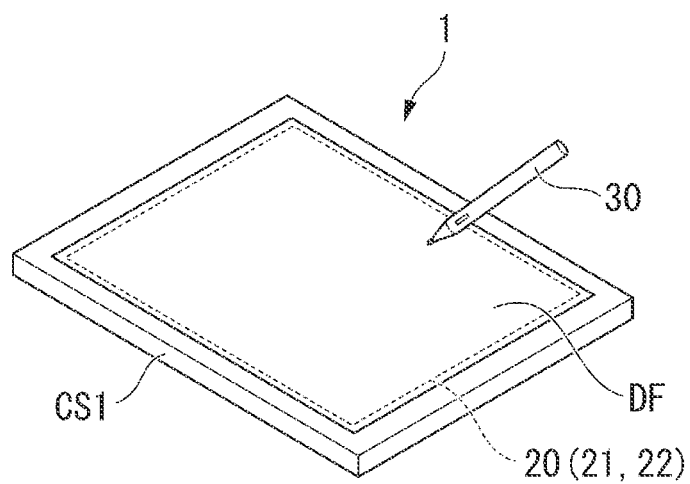
FIG. 1 is an external view illustrating an example of a tablet terminal.

FIG. 1 is an external view illustrating an example of a tablet terminal 1 according to this embodiment. Note that the tablet terminal 1 will be described as an example of the information processing apparatus in the present embodiment.

As illustrated in FIG. 1, a touch screen 20 is installed on one main surface of a chassis CS1 of the tablet terminal 1, on which an application program such as Notepad is executed using a pen 30.

The touch screen 20 includes a display unit 21 and a touch sensor unit 22. The display unit 21 displays various information on a display screen DF.

The touch sensor unit 22 is overlaid on the display unit 21 to detect a touch of the pen 30 (an example of an operation medium) on the display screen DF of the display unit 21 and detect the touch position of the pen 30.

Note that the details of the touch screen 20, the display unit 21, and the touch sensor unit 22 will be described later.

Figure 2:
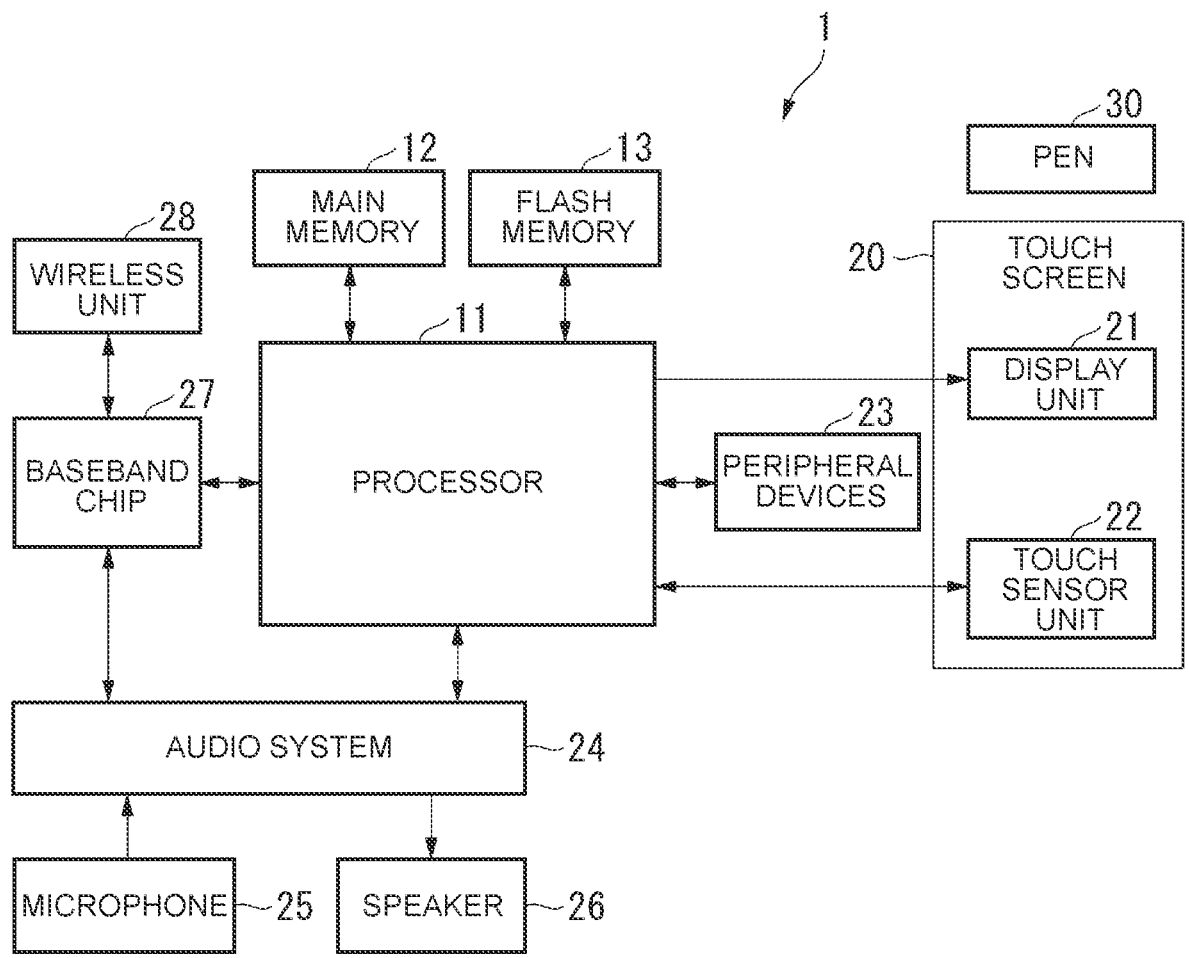
FIG. 2 is a diagram illustrating an example of the main hardware configuration of the tablet terminal.

Referring next to FIG. 2, the main hardware configuration of the tablet terminal 1 will be described.

FIG. 2 is a diagram illustrating an example of the main hardware configuration of the tablet terminal 1 according to the present embodiment.

As illustrated in FIG. 2, the tablet terminal 1 includes a processor 11, a main memory 12, a flash memory 13, the touch screen 20, peripheral devices 23, an audio system 24, a microphone 25, a speaker 26, a baseband chip 27, and a wireless unit 28.

The processor 11 is, for example, an application processor including a CPU (Central Processing Unit) 11. The processor 11 controls the entire tablet terminal 1.

The main memory 12 is a writable memory used as reading areas of execution programs of the processor 11 or working areas to which processing data of the execution programs are written. The main memory 12 is configured, for example, to include plural DRAM (Dynamic Random Access Memory) chips. The execution programs include an OS (Operating System), various drivers for hardware-operating peripheral devices, various services/utilities, application programs (application software), and the like.

The flash memory 13 is, for example, a flash EEPROM (Electrically Erasable Programmable Read Only Memory) to store the OS, various drivers, various services/utilities, application programs (hereinafter may be called "applications"), and various data.

The display unit 21 is, for example, a liquid crystal display or an organic EL (Electro-Luminescence) display to display a display screen based on drawing data (display data) output from the processor 11.

The touch sensor unit 22 detects the position of the pen 30 as the operation medium on the screen of the display unit 21, a touch of the pen 30 on the screen, and the touch position. The touch sensor unit 22 can detect the position of the pen 30 on the screen, for example, by capacitance method or electromagnetic induction method.

The peripheral devices 23 include, for example, a WLAN (Wireless Local Area Network) module, a Bluetooth (registered trademark) module, a GPS (Global Positioning System) module, sensors such as an acceleration sensor, a USB (Universal Serial Bus) connector, and the like.

The audio system 24 is, for example, an audio IC (Integrated Circuit) to input, record, play back, and output sound data. To the audio system 24, for example, the microphone 25 and the speaker 26 are connected. For example, the audio system 24 outputs sound data collected by the microphone 25 to the processor 11 or the baseband chip 27. Further, for example, the audio system 24 converts sound data acquired from the processor 11 or the baseband chip 27 to a sound signal, and outputs the sound signal to the speaker 26.

The microphone 25 collects sounds around the tablet terminal 1. For example, upon voice integration with other terminals, the microphone 25 collects sounds such as user's voice.

The speaker 26 outputs various sounds to the outside of the tablet terminal 1. For example, upon voice integration with other terminals, the speaker 26 outputs (emits) sounds received from the other terminals.

The baseband chip 27 is, for example, a dedicated IC to control wireless communication such as 4G (the fourth generation mobile communication system) or 5G (the fifth generation mobile communication system). The baseband chip 27 outputs voice data received, for example, by using the wireless unit 28 to the speaker 26 through the audio system 24. Further, for example, the baseband chip 27 acquires sound data collected from the microphone 25 through the audio system 24, and uses the wireless unit 28 to output the sound data through the mobile communication system. Further, the baseband chip 27 performs data communication with the processor 11 on input/output data of data communication through the mobile communication system.

The wireless unit 28 is a wireless communication device including an antenna for performing wireless communication through the mobile communication system.

The pen 30 is a pen-like operation medium such as a touch pen or a stylus pen. Note that the pen 30 may be configured to include a resonant circuit so that power is supplied to the pen 30 by electromagnetic induction to a coil in the resonant circuit to be able to detect the position and angle of the pen 30 on the screen of the display unit 21 using the resonant circuit.

Figures 3, 4:
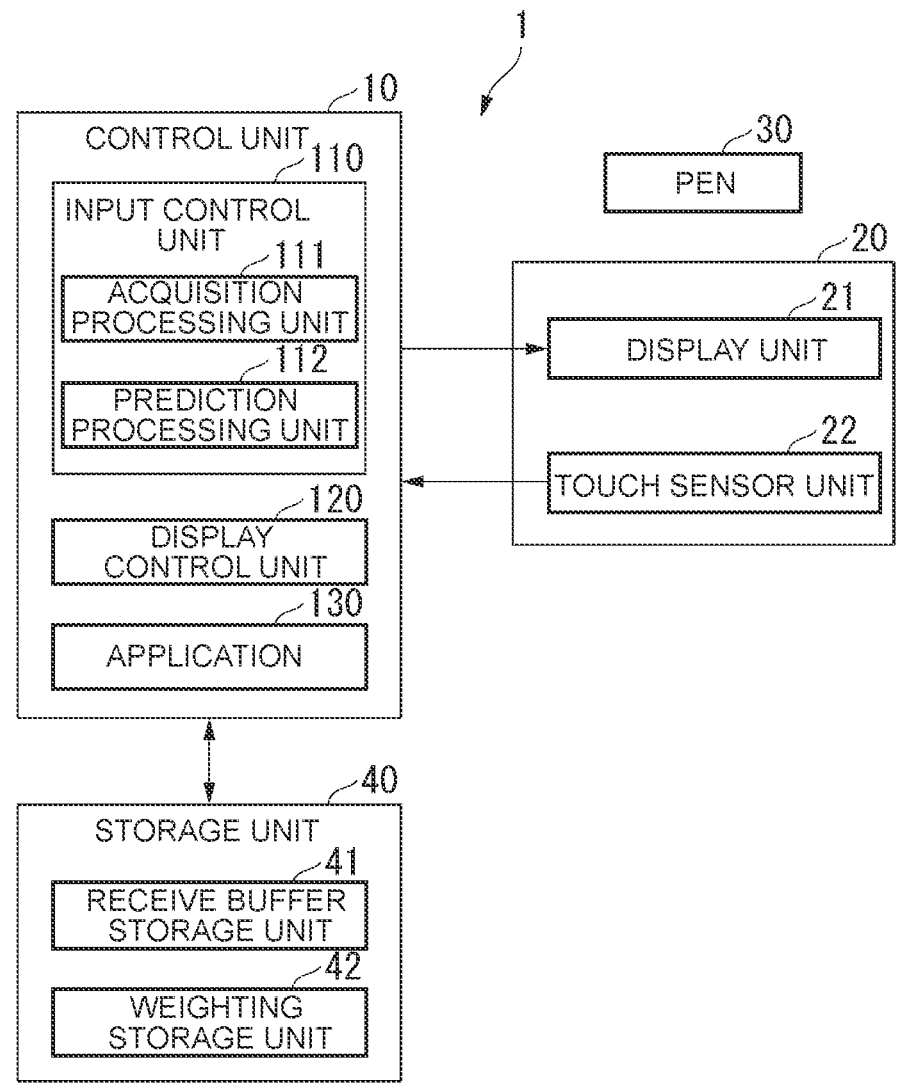
FIG. 3 is a block diagram illustrating an example of the functional configuration of the tablet terminal.
FIG. 4 is a table illustrating a data example of a weighting storage unit.

Referring next to FIG. 3, the functional configuration of the tablet terminal 1 according to the present embodiment will be described.

FIG. 3 is a block diagram illustrating an example of the functional configuration of the tablet terminal 1 according to the present embodiment.

As illustrated in FIG. 3, the tablet terminal 1 includes a control unit 10, the touch screen 20, the pen 30, and a storage unit 40.

The touch screen 20 includes the display unit 21 and the touch sensor unit 22.

The storage unit 40 is, for example, a storage unit realized by the main memory 12 or the flash memory 13, which includes a receive buffer storage unit 41 and a weighting storage unit 42.

The receive buffer storage unit 41 is, for example, a storage unit realized by the main memory 12. The receive buffer storage unit 41 temporarily stores pen sample data (first detection position data) as detection position data of the pen 30 detected by the touch sensor unit 22. Note that the pen sample data is position data on the screen of the display unit 21 detected by the touch sensor unit 22 in a sampling cycle (at a predetermined detection interval).

Further, the receive buffer storage unit 41 stores a predetermined number of (for example, four) buffer sample data (second detection position data) thinned out of plural pieces of pen sample data at two or more data intervals (for example, four sample data intervals). In the following description, pieces of buffer sample data may be called buffer samples for short.

The weighting storage unit 42 is, for example, a storage unit realized by the flash memory 13. The weighting storage unit 42 stores information on a correction weighting value W to be described later. Referring here to FIG. 4, a data example of the weighting storage unit 42 will be described.

FIG. 4 is a table illustrating a data example of the weighting storage unit 42 in the present embodiment.

As illustrated in FIG. 4, the weighting storage unit 42 stores a range of a correction index value L, classification, and a weighting value W in association with one another.

Here, the range of the correction index value L indicates a range of the correction index value L as an index value for correction of predictive position data to be described later. Incidentally, a possible range of the correction index value L is a range from −1.0 to +1.0 ($-1 \leq L \leq 1$). Further, the classification indicates the classification of handwriting input. Further, the weighting value W indicates a weighting value used for correction of predictive position data to be described later.

For example, in the example illustrated in FIG. 4, when the range of L is "$-1 \leq L < 1$" (when the correction index value L is −1 or more and smaller than L1), it is indicated that the classification is "almost straight," and the weighting value W is "W=0." Here, L1 is an example of a first threshold value, which is a negative value (L1<0). Further, "W=0" is a value corresponding to a case where no correction is performed.

Further, when the range of L is "L1≤L<L2" (when the correction index value L is L1 or more (first threshold value or more) and less than L2), it is indicated that the classification is "middle curve," and the weighting value W is "W=W1." Here, L2 is a value larger than L1 (first threshold value) and a negative value (L1<L2<0). Further, W1 is an example of the first weighting value, which is a value larger than 0 (W1>0).

Further, when the range of L is "L2≤L<L3" (when the correction index value L is L2 or more and less than L3), it is indicated that the classification "moderately sharp curve," and the weighting value W is "W=W3." Here, L3 is a value larger than L2 and a negative value (L2<L3<0). Further, W2 is an example of a second weighting value, which is a value larger than W1 (W2>W1).

Further, when the range of L is "L3≤L<L4" (when the correction index value L is L3 or more and less than L4), it is indicated that the classification is "sharp curve," and the weighting value W is "W=W3." Here, L4 is an example of a second threshold value, which is a value larger than L3 and a negative value (L3<L4<0). Further, W3 is an example of a third weighting value, which is a value larger than W2 (W3>W2).

Further, when the range of L is "L4≤L" (when the correction index value L is L4 or more), it is indicated that the classification is "irregular case," and no prediction is performed because the weighting value W is not set. Here, "L4≤L" strictly means "L4≤L≤1."

Thus, the weighting storage unit 42 stores the range of the correction index value L and the correction weighting value W in association with each other.

Returning to the description of FIG. 3, the control unit 10 is a functional unit implemented, for example, by the processor 11 executing a program stored in the main memory 12 or the flash memory 13, which executes various processing based on an OS (for example, Android (registered trademark) or the like). The control unit 10 includes an input control unit 110, a display control unit 120, and an application 130.

The input control unit 110 is a functional unit implemented by the processor 11. The input control unit 110 is, for example, a device driver for controlling input by the touch sensor unit 22 to detect the position and touch of the operation medium (for example, the pen 30) on the screen of the display unit 21 by input of the touch sensor unit 22. Further, the input control unit 110 outputs detected detection position data (pen sample data) and predictive position data indicative of a position at which the movement of the pen 30 is predicted. The input control unit 110 includes an acquisition processing unit 111 and a prediction processing unit 112.

The acquisition processing unit 111 is a functional unit implemented by the processor 11 to acquire plural pieces of pen sample data on the screen detected by the touch sensor unit 22 in sampling cycles (at predetermined detection intervals) as a result of touching of the pen 30 on the screen. The acquisition processing unit 111 stores, in the receive buffer storage unit 41, the acquired plural pieces of pen sample data in chronological order.

Figure 5:
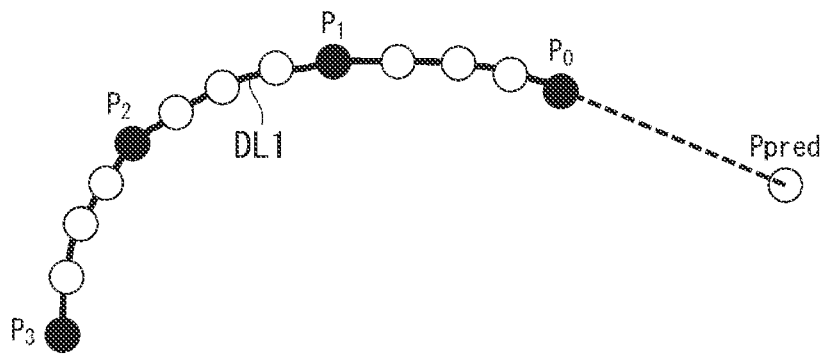
FIG. 5 is a diagram illustrating an example of pen sample data, buffer samples, and predictive position data.

The prediction processing unit 112 is a functional unit implemented by the processor 11 to generate predictive position data indicative of a predictive movement position of the pen 30. The prediction processing unit 112 executes prediction processing to generate predictive position data indicative of the predictive movement position of the pen 30 based on a predetermined number of buffer samples obtained by thinning out the plural pieces of pen sample data at two or more data intervals. Referring here to FIG. 5, the pen sample data, buffer samples, and predictive position data will be described.

FIG. 5 is a diagram illustrating an example of pen sample data, buffer samples, and predictive position data in the present embodiment.

In FIG. 5, black circles and white circles between $P_3$ to $P_0$ of a drawing line DL1 indicate pen sample data. Further, black circles of $P_3$ to $P_0$ indicate buffer samples obtained by thinning out the pen sample data at four sample intervals. Further, predictive position data Ppred indicates next detection position data (pen sample data) predicted by using the buffer sample $P_0$ to the buffer sample $P_3$.

The buffer sample $P_0$ is the latest pen sample data and buffer sample, and the buffer sample $P_1$, the buffer sample $P_2$, and the buffer sample $P_3$ are pen sample data older in this order. The prediction processing unit 112 extracts, from the plural pieces of pen sample data, the buffer sample $P_0$ to the buffer sample $P_3$ including the buffer sample $P_0$ as the latest pen sample data, and stores the buffer samples in the receive buffer storage unit 41 in chronological order.

Figure 6:
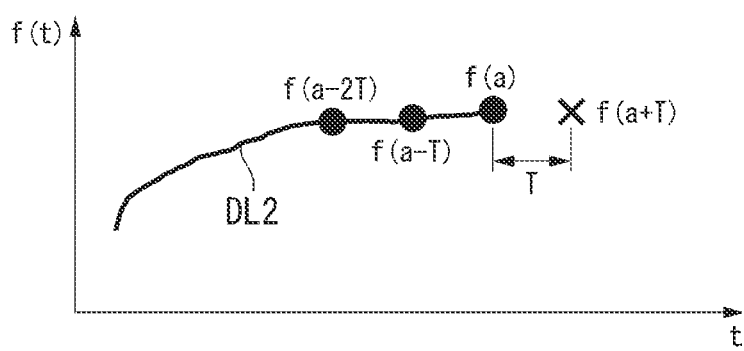
FIG. 6 is a graph for describing an example of prediction processing using Taylor series approximation.

Further, the prediction processing unit 112 generates the predictive position data Ppred of the pen 30 based on plural buffer samples (for example, the buffer sample $P_0$ to the buffer sample $P_3$). In the prediction processing, the prediction processing unit 112 generates predictive position data based, for example, on Taylor series approximation. Referring here to FIG. 6, prediction processing using the Taylor series approximation in the present embodiment will be described.

FIG. 6 is a graph for describing an example of prediction processing using the Taylor series approximation in the present embodiment.

In FIG. 6, by taking a drawing line DL2 of handwriting input as a function f(t) of time t, when a drawing position f(a+T) after the passage of a period T from f(a) is predicted, f(a+T) is represented by the Taylor series approximation in Formula (1) below.

$$f(a+T) \approx f(a) + \frac{f'(a)}{1!} \times T + \frac{f''(a)}{2!} \times T^2 \qquad (1)$$

In FIG. 6, f(a+T) corresponds to the predictive position data Ppred, f(a), f(a−T), and f(a−2T) correspond respectively to the buffer sample $P_0$, the buffer sample $P_1$, and the buffer sample $P_2$ illustrated in FIG. 5 described above.

Further, f' (a) as the 1st part of f(a) and a $2^{nd}$ derivative f"(a) are represented by Equation (2) below.

$$\left. \begin{array}{l} f'(a) = \dfrac{f(a) - f(a-T)}{T} \\ f''(a) = \dfrac{f'(a) - f'(a-T)}{T} \\ \phantom{f''(a)} = \dfrac{f(a) - 2f(a-T) + f(a-2T)}{T^2} \end{array} \right\} \qquad (2)$$

From Formula (1) and Equation (2), a position as the predicted position f(a+T) on the X-axis and Y-axis of the screen of the display unit 21 is represented by Formula (3) below.

$$f_x(a+T) \approx 2.5 \times f_x(a) - 2 \times f_x(a-T) + 0.5 \times f_x(a-2T) \brace f_y(a+T) \approx 2.5 \times f_y(a) - 2 \times f_y(a-T) + 0.5 \times f_y(a-2T)} \quad (3)$$

In the prediction processing, the prediction processing unit 112 uses Formula (3) to calculate the predictive position data Ppred.

Although Formula (1) to Formula (3) uses up to the third term of the Taylor series, the fourth term and subsequent terms may also be used. In other words, in the example described above, the example in which the buffer sample $P_0$ to the buffer sample $P_2$ are used to calculate the predictive position data Ppred is described, but the buffer sample $P_0$ to the buffer sample $P_3$ may also be used to calculate the predictive position data Ppred.

Figure 7:
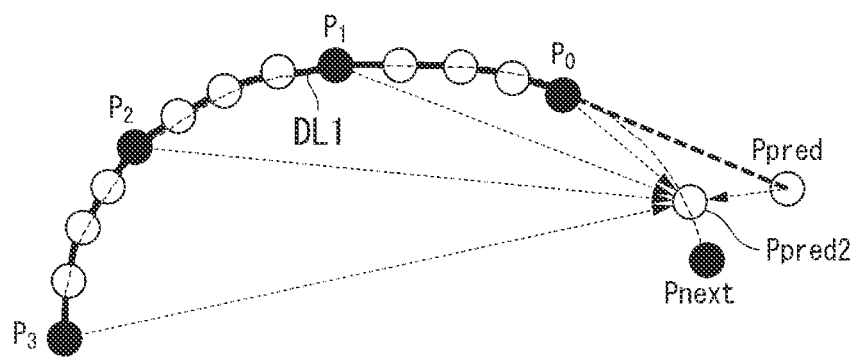
FIG. 7 is a diagram illustrating an example of prediction processing and correction processing.

Returning to the description of FIG. 3 again, the prediction processing unit 112 uses the buffer sample $P_0$ to the buffer sample $P_3$ to correct the predictive position data Ppred calculated by the prediction processing. Referring here to FIG. 7, correction processing for correcting the predictive position data Ppred to generate corrected predictive position data Ppred2 will be described.

FIG. 7 is a diagram illustrating an example of prediction processing and correction processing in the present embodiment.

As illustrated in FIG. 7, the prediction processing unit 112 generates the corrected predictive position data Ppred2 based on the predictive position data Ppred and the predetermined number of buffer samples ($P_0$ to $P_3$). Note that a position Pnext is actual detection position data in FIG. 7.

Figure 8:
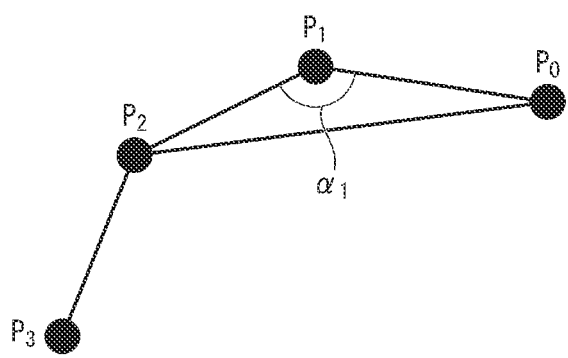
FIG. 8 is a diagram illustrating an example of an angle $\alpha_1$.

In order to perform the correction processing, the prediction processing unit 112 executes selection processing to select a correction weighting value W according to a correction index value L based on the cosine value of an angle having, as a vertex, the second point of at least the latest three points among the predetermined number of buffer samples ($P_0$ to $P_3$). Referring here to FIG. 8, the calculation of the correction index value L by the prediction processing unit 112 will be described.

FIG. 8 is a diagram illustrating an example of an angle $\alpha_1$ in the present embodiment.

In FIG. 8, the angle $\alpha_1$ is an angle having, as the vertex, the second point (buffer sample $P_1$) of three-point buffer samples ($P_0$ to $P_2$). The correction index value L based on this angle $\alpha_1$ is represented by Equation (4) below.

$$L = \cos \alpha_1 = -\frac{|P_1 P_0|^2 + |P_1 P_2|^2 - |P_2 P_0|^2}{2 \times |P_1 P_0| \times |P_1 P_2|} \quad (4)$$

Here, $|P^*_1 P^*_2|$ indicates distance (length) between buffer sample $P^*_1$ and buffer sample $P^*_2$.

In the selection processing, the prediction processing unit 112 uses Equation (4) to calculate the correction index value L from the three-point buffer samples ($P_0$ to $P_2$). Here, the correction index value L is a value in a range from −1.0 to +1.0 (−1≤L≤1).

Further, the prediction processing unit 112 refers to the weighting storage unit 42 to acquire a correction weighting value W corresponding to the correction index value L. Here, in the selection processing, when the correction index value L is a negative value and smaller than the threshold value L1 (first threshold value) (−1≤L<L1, L1<0), the prediction processing unit 112 selects as the correction weighting value W. Note that the correction weighting value W of "0" (W=0) is a value corresponding to a case where no correction is performed. In other words, the prediction processing unit 112 switches whether or not to perform correction on the predictive position data Ppred depending on whether or not the correction index value L is a negative value and smaller than the threshold value L1.

Further, when the correction index value L is a negative value, and equal to or more than the threshold value L1 and smaller than the threshold value L2 (L1≤L<L2, L2<0), the prediction processing unit 112 refers to the weighting storage unit 42 to select W1 as the correction weighting value W.

Further, when the correction index value L is a negative value, and equal to or more than the threshold value L2 and smaller than the threshold value L3 (L2≤L<L3, L3<0), the prediction processing unit 112 refers to the weighting storage unit 42 to select W2 as the correction weighting value W.

Further, when the correction index value L is a negative value, and equal to or more than the threshold value L3 and smaller than the threshold value L4 (second threshold value) (L3≤L<L4, L4<0), the prediction processing unit 112 refers to the weighting storage unit 42 to select W3 as the correction weighting value W.

Further, when the correction index value L is equal to or more than the threshold value L4 (equal to or more than the second threshold value) (L4≤L), the prediction processing unit 112 refers to the weighting storage unit 42 to disable the prediction processing and output the buffer sample $P_0$ as the predictive position data.

Note that the relation of the weighting value W1 to weighting value W3 is W1<W2<W3. When the correction index value L is a negative value and equal to or more than the threshold value L1 in the selection processing, the prediction processing unit 112 selects a larger value as the correction weighting value W as the correction index value L is larger.

Further, the prediction processing unit 112 executes correction processing for correcting the predictive position data Ppred based on the predetermined number of buffer samples ($P_0$ to $P_3$) including the latest three points and the weighting value W. For example, the prediction processing unit 112 uses Equation (5) below to correct the predictive position data Ppred so as to generate the corrected predictive position data Ppred2.

$$Ppred2 = \frac{Ppred \times 1 + P_0 \times w + P_1 \times w^2 + P_2 \times w^3 + P_3 \times w^4}{1 + w + w^2 + w^3 + w^4} \quad (5)$$

The input control unit 110 outputs the pen sample data and the predictive position data (Ppred2 or Ppred) to the application 130 to be described later.

Note that when the weighting value W is "0," the corrected predictive position data Ppred2 becomes equal to the predictive position data Ppred (Ppred2=Ppred) from Equation (5). In this case, the prediction processing unit 112 outputs, as the predictive position data, the predictive position data Ppred as it is. In other words, in this case, the input control unit 110 outputs the pen sample data and the predictive position data Ppred to the application 130.

Further, when the correction index value L is equal to or more than the threshold value L4 (L4≤L), the prediction processing unit 112 determines that the classification is the irregular case, and disables the prediction processing without outputting predictive position data. In other words, in this case, the input control unit 110 outputs only the pen sample data to the application 130.

Further, the values of W1, W2, and W3 are so set that a curve in a corresponding range of the correction index value L matches with the calculated corrected predictive position data Ppred2.

Returning to the description of FIG. 3 again, the display control unit 120 (an example of a display processing unit) is a functional unit implemented by the processor 11. The display control unit 120 is, for example, a device driver for controlling the display of the display unit 21 to display, on the display unit 21, a movement trajectory on the screen as a result of touching and moving of the pen 30 on the screen based on the pen sample data and the predictive position data output by the prediction processing unit 112. For example, the display control unit 120 displays, on the display unit 21, the drawing line DL1 by the pen sample data included from the buffer sample $P_3$ to the buffer sample $P_0$ of the drawing line DL1 illustrated in FIG. 7, and a line between the buffer sample $P_0$ and the corrected predictive position data Ppred2 as the movement trajectory.

Further, when the latest pen sample data is added to the plural pieces of pen sample data, the display control unit 120 displays, on the display unit 21, a movement trajectory obtained by replacing the predictive position data (for example, the corrected predictive position data Ppred2) with the latest pen sample data.

The application 130 is a functional unit implemented by the processor 11 to execute predetermined processing, for example, by executing a predetermined application program. Here, the predetermined application program is, for example, a program such as instant memo having a memo function to accept handwriting input of the pen 30 by the touch screen 20 and display a movement trajectory of the pen 30 on the screen of the display unit 21. The application 130 displays the pen sample data and the predictive position data acquired through the input control unit 110 on the display unit 21 through the display control unit 120 as a movement trajectory of the pen 30.

Figure 9:
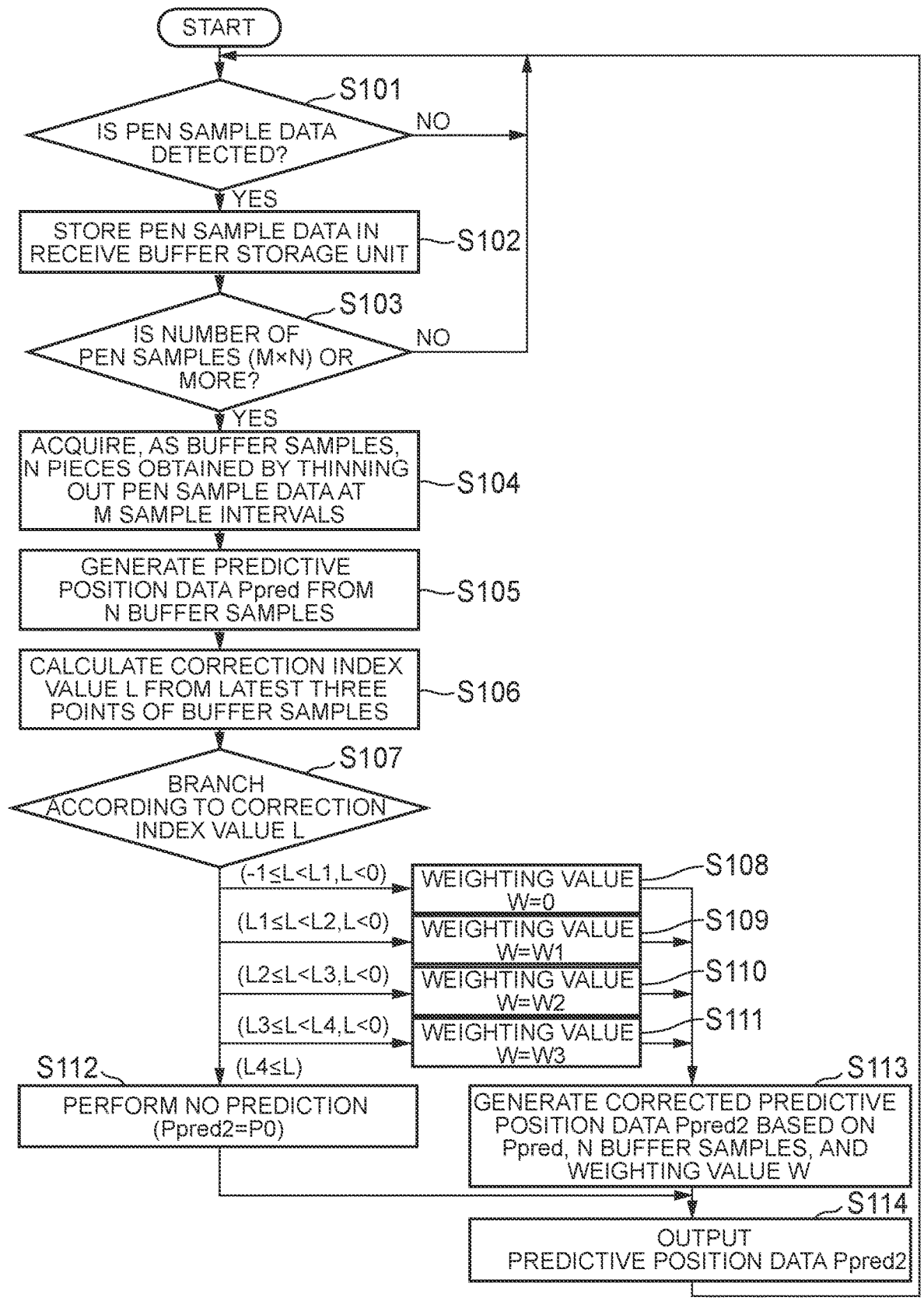
FIG. 9 is a flowchart illustrating an example of the operation of the tablet terminal.

Referring next to FIG. 9, the operation of the tablet terminal 1 according to the present embodiment will be described.

FIG. 9 is a flowchart illustrating an example of the operation of the tablet terminal 1 according to the present embodiment. Here, the operation of the input control unit 110 will be described.

As illustrated in FIG. 9, the input control unit 110 of the tablet terminal 1 first determines whether or not pen sample data is detected (step S101). For example, the input control unit 110 determines whether or not the touch sensor unit 22 detects touching of the pen 30 and detects pen sample data in sampling cycles. When the touch sensor unit 22 detects pen sample data (step S101: YES), the input control unit 110 advances the processing to step S102. On the other hand, when the touch sensor unit 22 does not detect pen sample data (step S101: NO), the input control unit 110 returns the processing to step S101.

In step S102, the input control unit 110 stores the pen sample data in the receive buffer storage unit 41. In other words, the acquisition processing unit 111 of the input control unit 110 acquires the pen sample data detected by the touch sensor unit 22, and stores the pen sample data in the receive buffer storage unit 41 in order of acquisition (in chronological order).

Next, the acquisition processing unit 111 determines whether or not the number of pen samples is (M×N) or more (step S103). When the number of pen samples of the acquired pen sample data is (M×N) or more (step S103: YES), the acquisition processing unit 111 advances the processing to step S104. On the other hand, when the number of pen samples of the acquired pen sample data is less than (M×N) (step S103: NO), the acquisition processing unit 111 returns the processing to step S101.

In step S104, the prediction processing unit 112 of the input control unit 110 acquires, as buffer samples, N pieces obtained by thinning out the pen sample data at M sample intervals. For example, as the buffer sample $P_0$ to the buffer sample $P_3$ in FIG. 5, the prediction processing unit 112 acquires four (N=4) buffer samples at four sampling intervals (M=4), and stores the four buffer samples ($P_0$ to $P_3$) in the receive buffer storage unit 41.

Next, the prediction processing unit 112 generates predictive position data Ppred from the N buffer samples (step S105). For example, the prediction processing unit 112 uses Formula (3) described above to calculate the predictive position data Ppred from the buffer sample $P_0$ to the buffer sample $P_2$.

Next, the prediction processing unit 112 calculates the correction index value L from the latest three points of buffer samples (step S106). For example, the prediction processing unit 112 uses Equation (4) described above to calculate the correction index value L from the buffer sample $P_0$ to the buffer sample $P_2$.

Next, the prediction processing unit 112 branches the processing according to the correction index value L (step S107). The prediction processing unit 112 refers to the weighting storage unit 42 to branch the processing according to the correction index value L. For example, when the correction index value L is a negative value, and −1 or more and smaller than the threshold value L1 (−1≤L<L1, L<0), the prediction processing unit 112 advances the processing to step S108.

Further, for example, when the correction index value L is a negative value, and equal to or more than the threshold value L1 and smaller than the threshold value L2 (step S107: L1≤L<L2, L<0), the prediction processing unit 112 advances the processing to step S109.

Further, for example, when the correction index value L is a negative value, and equal to or more than the threshold value L2 and smaller than the threshold value L3 (step S107: L2≤L<L3, L<0), the prediction processing unit 112 advances the processing to step S110.

Further, for example, when the correction index value L is a negative value, and equal to or more than the threshold value L3 and smaller than the threshold value L4 (step S107: L3≤L<L4, L<0), the prediction processing unit 112 advances the processing to step S111.

Further, for example, when the correction index value L is equal to or more than the threshold value L4 (step S107: L4≤L), the prediction processing unit 112 advances the processing to step S112.

In step S108, the prediction processing unit 112 selects "0" as the weighting value W (W=0). After the process in step S108, the prediction processing unit 112 advances the processing to step S113.

Further, in step S109, the prediction processing unit 112 selects W1 as the weighting value W (W=W1). After the process of step S109, the prediction processing unit 112 advances the processing to step S113.

Further, in step S110, the prediction processing unit 112 selects W2 as the weighting value W (W=W2). After the process of step S110, the prediction processing unit 112 advances the processing to step S113.

Further, in step S111, the prediction processing unit 112 selects W3 as the weighting value W (W=W3). After the process of step S111, the prediction processing unit 112 advances the processing to step S113.

Further, in step S112, the prediction processing unit 112 does not perform the prediction processing (Ppred2=$P_0$). In other words, the prediction processing unit 112 stops the prediction processing and does not generate predictive position data. After the process of step S112, the prediction processing unit 112 advances the processing to step S114.

In step S113, the prediction processing unit 112 generates corrected predictive position data Ppred2 based on the generated predictive position data Ppred, N buffer samples, and the weighting value W. The prediction processing unit 112 generates the corrected predictive position data Ppred2, for example, using Equation (5) described above from the predictive position data Ppred, such as four buffer samples $P_0$ to $P_3$, and the weighting value W.

Next, the prediction processing unit 112 outputs the predictive position data Ppred2 (step S114). The prediction processing unit 112 outputs the corrected predictive position data Ppred2 as predictive position data. In other words, the input control unit 110 outputs the pen sample data acquired by the acquisition processing unit 111, and the predictive position data (any of the corrected predictive position data Ppred2, the predictive position data Ppred, and the pen sample data $P_0$) to the application 130, for example. After the process of step S114, the prediction processing unit 112 returns the processing to step S101.

Note that the application 130 displays, on the display unit 21, a movement trajectory of the pen 30 based on the pen sample data and the predictive position data (corrected predictive position data Ppred2) acquired from the input control unit 110, for example, as illustrated in FIG. 7.

Referring next to FIG. 10 to FIG. 13, specific examples of selection processing (change processing) of the weighting value W according to the present embodiment will be described.

Figure 10:
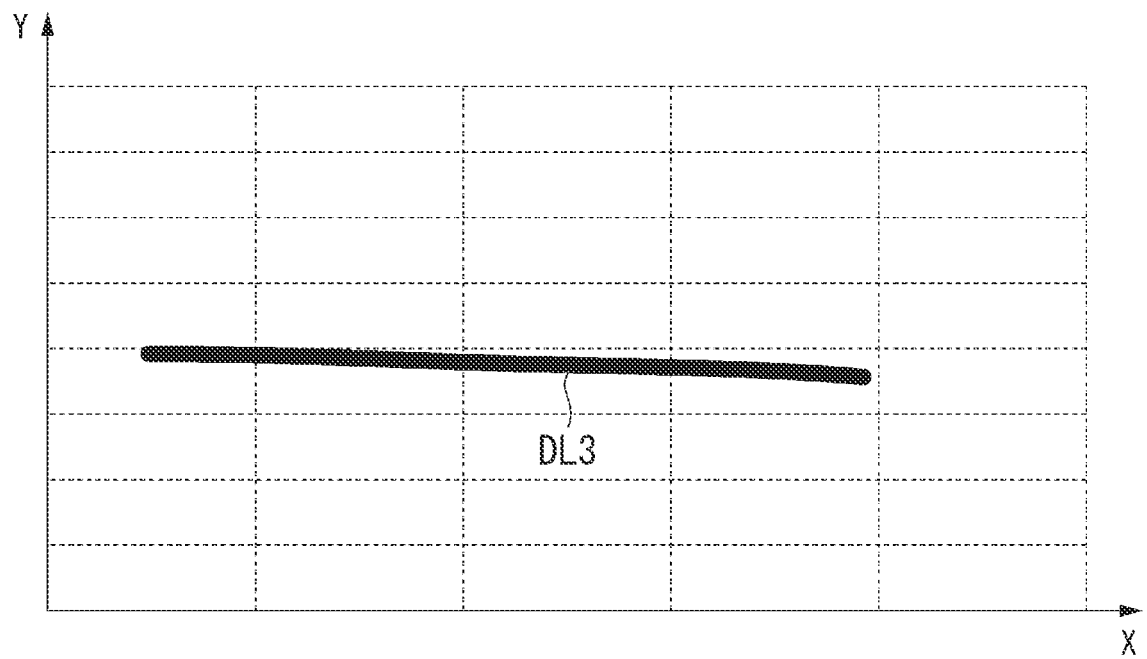
FIG. 10 is a graph illustrating an example of a drawing trajectory when a straight line is input by handwriting.

FIG. 10 is a graph illustrating an example of a drawing trajectory when a straight line is input by handwriting in the present embodiment. Further, FIG. 11 is a graph illustrating an example of changing the weighting value W when the straight line is input by handwriting in the present embodiment.

In FIG. 10, the vertical axis of the graph represents the coordinates in the Y-axis direction indicative of the vertical axis of the touch screen 20 (the display unit 21 and the touch sensor unit 22), and the horizontal axis of the graph represents the coordinates in the X-axis direction indicative of the horizontal axis of the touch screen 20 (the display unit 21 and the touch sensor unit 22). Further, a drawing line DL3 indicates a drawing line input by handwriting on the touch screen 20 using the pen 30.

Figure 11:
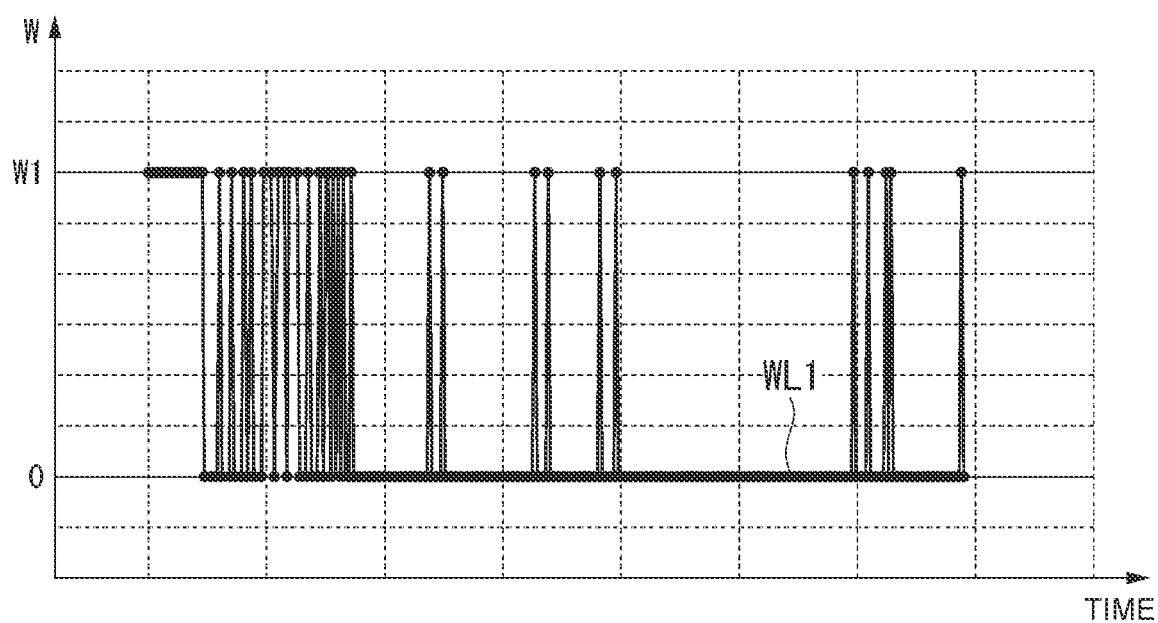
FIG. 11 is a graph illustrating an example of changing a weighting value W when the straight line is input by handwriting.

Further, in FIG. 11, the vertical axis of the graph represents the weighting value W, and the horizontal axis of the graph represents time. Further, a waveform WL1 represents changes in weighting value W for the drawing line DL3 input by handwriting described above.

Since the drawing line DL3 is almost straight, the prediction processing unit 112 selects almost "0" as the weighting value W and selects W1 on rare occasions as indicated by the waveform WL1 in FIG. 11.

Figure 12:
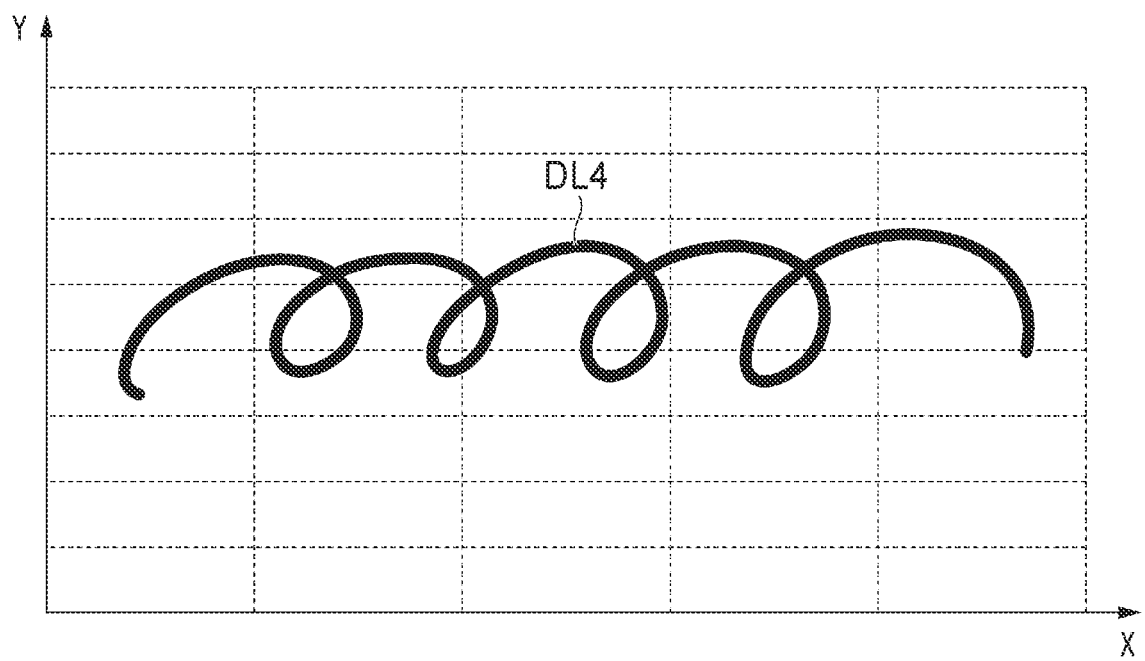
FIG. 12 is a graph illustrating an example of a drawing trajectory when a curve is input by handwriting.

On the contrary, FIG. 12 is a graph illustrating an example of a drawing trajectory when a curve is input by handwriting in the present embodiment. Further, FIG. 13 is a graph illustrating an example of changing the weighting value W when the curve is input by handwriting in the present embodiment.

In FIG. 12, the vertical axis of the graph represents the coordinates in the Y-axis direction indicative of the vertical axis of the touch screen 20 (the display unit 21 and the touch sensor unit 22), and the horizontal axis of the graph represents the coordinates in the X-axis direction indicative of the horizontal axis of the touch screen 20 (the display unit 21 and the touch sensor unit 22). Further, a drawing line DL4 indicates a drawing line input by handwriting on the touch screen 20 using the pen 30. As the drawing line DL4 here, a continuous curve is input.

Figure 13:
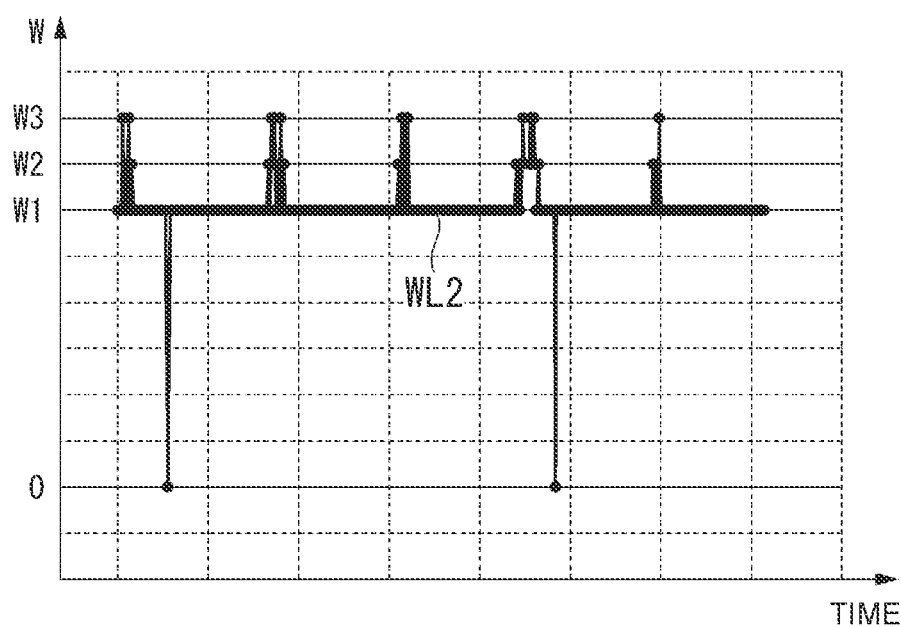
FIG. 13 is a graph illustrating an example of changing the weighting value W when the curve is input by handwriting.

Further, in FIG. 13, the vertical axis of the graph represents the weighting value W, and the horizontal axis of the graph represents time. Further, a waveform WL2 represents changes in weighting value W for the drawing line DL4 input by handwriting described above.

Since the drawing line DL4 is the continuous curve, the prediction processing unit 112 selects W1 to W3 as the weighting value W and selects on rare occasions as indicated by the waveform WL2 in FIG. 13. On the drawing line DL4, there are four places where the angle of the curve changes significantly, and the prediction processing unit 112 selects the maximum weighting value of W3 in the corresponding four places of the waveform WL2.

As described above, the tablet terminal 1 (information processing apparatus) according to the present embodiment includes the display unit 21, the touch sensor unit 22, the acquisition processing unit 111, the prediction processing unit 112, and the display control unit 120 (display processing unit). The touch sensor unit 22 is placed on the screen of the display unit 21 to detect a touch with an object on the screen. The acquisition processing unit 111 acquires plural pieces of pen sample data (first detection position data) on the screen detected by the touch sensor unit 22 at predetermined detection intervals as a result of touching of the operation medium (for example, the pen 30) on the screen. The prediction processing unit 112 is a processing unit for generating predictive position data indicative of a predictive movement position of the operation medium (for example, the pen 30), which executes prediction processing, selection processing, and correction processing. As the prediction processing, the prediction processing unit 112 generates predictive position data (Ppred) indicative of the predictive movement position of the operation medium based on a predetermined number of buffer sample data (second detection position data) obtained by thinning out plural pieces of pen sample data at two or more data intervals. As the selection processing, the prediction processing unit 112 selects a correction weighting value W according to a correction index value L based on a cosine value (cos $\alpha_1$ of an angle ($\alpha_1$) having, as a vertex ($P_1$), the second point of at least the latest three points ($P_0$ to $P_2$) among the predetermined number of buffer sample data. As the correction processing, the prediction processing unit 112 corrects the predictive position data (Ppred) based on the predetermined number of buffer sample data ($P_0$ to $P_3$) including the latest three points and the weighting value W. Based on the pen sample data ($P_0$ to $P_3$) and the predictive position data (for example, Ppred2) output by the prediction processing unit 112, the display control unit 120 displays, on the display unit 21, a movement trajectory on the screen as a result of touching and moving of the operation medium (for example, the pen 30) on the screen.

Thus, the tablet terminal 1 according to the present embodiment can reduce a handwriting input-to-display delay while improving prediction accuracy upon handwriting input.

For example, as illustrated in FIG. 6, the prediction processing can predict a farther position as the sample interval T used for prediction is longer. Therefore, in the tablet terminal 1 according to the present embodiment, the sample interval T can be lengthened (increased) by performing the prediction processing using the predetermined number of buffer sample data obtained by thinning out the plural pieces of pen sample data at two or more data intervals, and hence the handwriting input-to-display delay can be reduced.

Further, in the tablet terminal 1 according to the present embodiment, since the prediction processing unit 112 changes the weighting value W according to the correction index value L and corrects the predictive position data (Ppred) based on the weighting value W, prediction accuracy can be improved.

Thus, the tablet terminal 1 according to the present embodiment can reduce the handwriting input-to-display delay while improving prediction accuracy upon handwriting input.

Particularly, when a curve is input by handwriting, such a tailing effect that predictive position data tails outside the curve like a straight line can occur, and user experience may decline.

On the contrary, in the tablet terminal 1 according to the present embodiment, the occurrence of the tailing effect can be reduced by performing such a correction as to change the weighting value W according to the correction index value L, and hence user experience and usability can be improved.

Further, in the present embodiment, when the correction index value L is a negative value and smaller than the threshold value L1 (first threshold value) in the selection processing, the prediction processing unit 112 selects, as the correction weighting value W, the value ("0") corresponding to a case where no correction is performed, and outputs the predictive position data (Ppred) without performing correction. In other words, when the correction index value L is a negative value and smaller than the threshold value L1 (first threshold value), the prediction processing unit 112 does not have to execute the correction processing. Note that the threshold value L1 (first threshold value) is, for example, a value corresponding to the correction index value L when handwriting input represents an almost straight line.

Thus, the tablet terminal 1 according to the present embodiment can switch whether or not to execute correction processing according to the correction index value L, and this can improve prediction accuracy.

Further, in the present embodiment, when the correction index value L is a negative value and equal to or more than the threshold value L1 (first threshold value) in the selection processing, the prediction processing unit 112 selects, as the correction weighting value W, a larger value as the correction index value L is larger.

Thus, the tablet terminal 1 according to the present embodiment can perform appropriate correction according to the steepness (steepness and gentleness) of a curve input by handwriting, and can further improve prediction accuracy.

Further, in the present embodiment, when the correction index value L is a negative value and equal to or more than the threshold value L4 (second threshold value) larger than the threshold value L1 (first threshold value) in the selection processing, the prediction processing unit 112 does not execute the prediction processing. In this case, the display control unit 120 displays, on the display unit 21, a movement trajectory not including the predictive position data (Ppred or Ppred2).

Thus, for example, in a case of a curve changing at a steep angle that is difficult to predict in the prediction processing, since the tablet terminal 1 according to the present embodiment does not execute the prediction processing, prediction accuracy is not unnecessarily reduced.

Further, in the present embodiment, the prediction processing unit 112 generates the predictive position data Ppred in the prediction processing based on the Taylor series approximation (for example, Formula (3)).

Thus, the tablet terminal 1 according to the present embodiment can generate the predictive position data Ppred by the simple method called the Taylor series approximation without increasing the amount of processing.

Further, in the present embodiment, when the latest pen sample data is added to the plural pieces of pen sample data (first detection position data), the display control unit 120 displays, on the display unit 21, a movement trajectory obtained by replacing the predictive position data (Ppred or Ppred2) with the latest pen sample data.

Thus, the tablet terminal 1 according to the present embodiment can display a correct movement trajectory of handwriting input after the handwriting input while reducing the handwriting input-to-display delay upon handwriting input, and this can improve usability.

Further, a control method according to the present embodiment is a control method for the tablet terminal 1 (information processing apparatus) including the display unit 21, and the touch sensor unit 22 placed on the screen of the display unit 21 to detect a touch with an object on the screen, the control method including an acquisition step, a prediction step, and a display step. In the acquisition step, the acquisition processing unit 111 acquires plural pieces of pen sample data on the screen detected by the touch sensor unit 22 at predetermined detection intervals as a result of touching of the operation medium (for example, the pen 30) on the screen. In the prediction step, the prediction processing unit 112 executes prediction processing, selection processing, and correction processing. In the prediction processing, the prediction processing unit 112 generates predictive position data (Ppred) indicative of a predictive movement position of the operation medium (for example, the pen 30) based on a predetermined number of buffer sample data obtained by thinning out the plural pieces of pen sample data at two or more data intervals. In the selection processing, the prediction processing unit 112 selects a correction weighting value W according to a correction index value L based on a cosine value (cos $\alpha_1$) of an angle ($\alpha_1$) having, as a vertex, the second point of at least the latest three points among the predetermined number of buffer sample data. In the correction processing, the prediction processing unit 112 corrects the predictive position data (Ppred) based on the latest three points in the predetermined number of buffer sample data and the weighting value W. In the display step, the display control unit 120 displays, on the display unit 21, a movement trajectory on the screen as a result of touching and moving of the operation medium (for example, the pen 30) on the screen based on pen sample data and the predictive position data (Ppred or Ppred2) output by the prediction processing unit 112.

Thus, the control method according to the present embodiment has the same effect as the tablet terminal 1 described above, and can reduce the handwriting input-to-display delay while improving prediction accuracy upon handwriting input.

Note that the tablet terminal 1 (information processing apparatus) according to the present embodiment may also be in the following form. The tablet terminal 1 (information processing apparatus) according to the present embodiment includes: the display unit 21; the touch sensor unit 22 which detects a touch position of the operation medium (for example, the pen 30) on the screen of the display unit 21; the main memory 12 (memory) which temporarily stores a program; and the processor 11 which executes the program stored in the main memory 12. The processor 11 executes the program stored in the main memory 12 to execute acquisition processing, prediction processing, selection processing, correction processing, and display processing. In the acquisition processing, the processor 11 acquires plural pieces of pen sample data on the screen detected by the touch sensor unit 22 at predetermined detection intervals as a result of touching of the operation medium (for example, the pen 30) on the screen. In the prediction processing, the processor 11 generates predictive position data (Ppred) indicative of a predictive movement position of the operation medium (for example, the pen 30) based on a predetermined number of buffer sample data obtained by thinning out the plural pieces of pen sample data at two or more data intervals. In the selection processing, the processor 11 selects a correction weighting value W according to a correction index value L based on a cosine value ($\cos \alpha_1$) of an angle ($\alpha_1$) having, as a vertex, the second point of at least the latest three points among the predetermined number of buffer sample data. In the correction processing, the processor 11 corrects the predictive position data (Ppred) based on the latest three points in the predetermined number of buffer sample data and the weighting value W. In the display processing, the processor 11 displays, on the display unit 21, a movement trajectory on the screen as a result of touching and moving of the operation medium (for example, the pen 30) on the screen based on pen sample data and the predictive position data (Ppred or Ppred2) output by the prediction processing unit 112.

Thus, the tablet terminal 1 according to the present embodiment has the same effect as the control method described above, and can reduce the handwriting input-to-display delay while improving prediction accuracy upon handwriting input.

Second Embodiment

Next, a tablet terminal 1a according to a second embodiment will be described with reference to a drawing.

Figure 14:
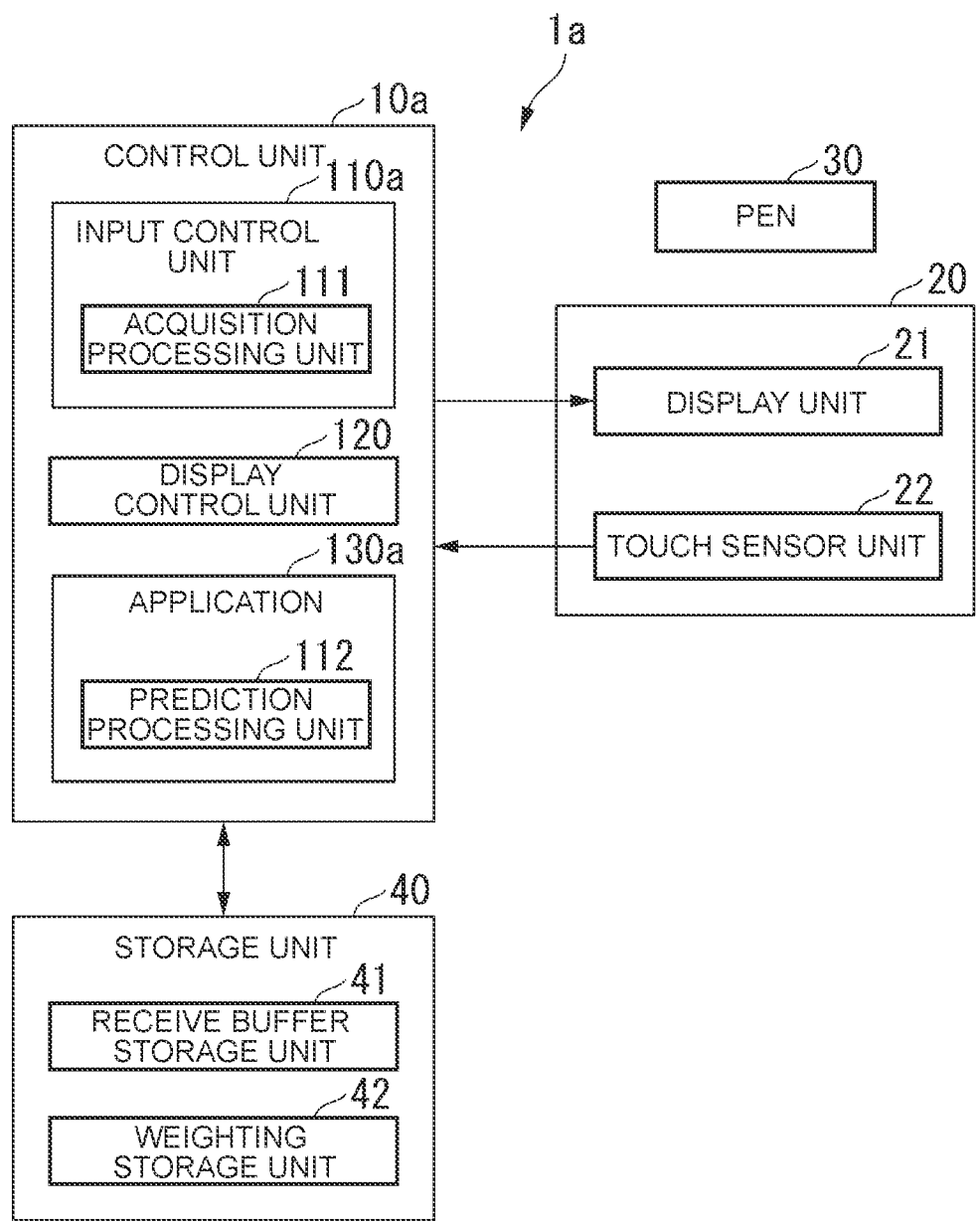
FIG. 14 is a block diagram illustrating an example of the functional configuration of a tablet terminal.

FIG. 14 is a block diagram illustrating an example of the functional configuration of the tablet terminal 1a according to the second embodiment. In this embodiment, a modification example in which an application 130a executes prediction processing instead of an input control unit 110a will be described.

Since the external view and the main hardware configuration of the tablet terminal 1a according to the second embodiment are the same as those of the first embodiment illustrated in FIG. 1 and FIG. 2, the description thereof will be omitted here.

As illustrated in FIG. 14, the tablet terminal 1a includes a control unit 10a, the touch screen 20, the pen 30, and the storage unit 40. In FIG. 14, the same numerals are given to the same components as those in FIG. 3 described above to omit the description thereof.

The control unit 10a is, for example, a functional unit implemented by the processor 11 executing a program stored in the main memory 12 or the flash memory 13 to execute various processing based on an OS (for example, Android (registered trademark)). The control unit 10a includes the input control unit 110a, the display control unit 120, and the application 130a.

The input control unit 110a is a functional unit implemented by the processor 11. The input control unit 110a is, for example, a device driver for controlling input by the touch sensor unit 22 to detect the position and touch of the operation medium (for example, the pen 30) on the screen of the display unit 21 by input of the touch sensor unit 22. The input control unit 110a includes the acquisition processing unit 111.

Note that the input control unit 110a of the present embodiment is different from the first embodiment in that the application 130a includes the prediction processing unit 112 included in the input control unit 110 of the first embodiment described above.

The application 130a is a functional unit implemented by the processor 11 to execute predetermined processing, for example, by executing a predetermined application program. Here, the predetermined application program is, for example, a program such as instant memo having a memo function to accept handwriting input of the pen 30 by the touch screen 20 and display a movement trajectory of the pen 30 on the screen of the display unit 21.

Further, the application 130a includes the prediction processing unit 112. Since processing of the prediction processing unit 112 is the same as that of the first embodiment, the description thereof will be omitted here.

The application 130a displays pen sample data, acquired through the input control unit 110, and predictive position data, generated by the prediction processing unit 112, on the display unit 21 through the display control unit 120 as a movement trajectory of the pen 30.

As described above, in the tablet terminal 1a according to the present embodiment, the application 130a includes the prediction processing unit 112, and the prediction processing described above is executed in the application 130a.

Thus, the tablet terminal 1a according to the present embodiment has the same effect as that of the first embodiment, and can reduce the handwriting input-to-display delay while improving prediction accuracy upon handwriting input.

Note that the present disclosure is not limited to each of the aforementioned embodiments, and changes can be made without departing from the scope of the present disclosure.

For example, in each of the aforementioned embodiments, the example in which the information processing apparatus is the tablet terminal 1 (1a) is described, but the present disclosure is not limited to this example. The information processing apparatus may also be, for example, a smartphone, a laptop personal computer having a tablet mode, or the like.

Further, in each of the aforementioned embodiments, the example in which the Taylor series approximation is used in the prediction processing for generating predictive position data is described, but the present disclosure is not limited to this example, and the predictive position data may also be generated by any other method.

Further, in each of the aforementioned embodiments, the example of using Equation (5) as an example of correction processing using the weighting value W is described, but the present disclosure is not limited to this example, and any other type of correction may also be performed.

Further, in each of the aforementioned embodiments, the example in which the correction index value L is calculated by using an angle $\alpha_1$ in one place is described, but the correction index value L may also be calculated by using angles in plural places. Further, in this case, an average value of correction index values L in plural places may be used as the correction index value.

Further, in each of the aforementioned embodiments, the example in which, when the correction index value L is smaller than the threshold value L1, the predictive position data Ppred is used as it is without executing correction processing is described, but the present disclosure is not limited to this example. When the correction index value L is a negative value and smaller than the threshold value L1, the prediction processing unit 112 may also generate and use father predictive position data Ppred by buffer samples further wider in sample interval.

Further, in each of the aforementioned embodiments, the example in which the prediction processing unit 112 uses some of the predetermined number of buffer samples in prediction processing is described, but all the predetermined number of buffer samples may also be used to execute the prediction processing. Further, the predetermined number N and the sample interval M are not limited to those in each of the aforementioned embodiments, and these may be any other values depending on the prediction processing method and the processing amount, and the correction processing method and the processing amount.

Further, in each of the aforementioned embodiments, the example in which the operation medium is the pen 30 is described, but the present disclosure is not limited to this example. For example, the operation medium may also be any other operation medium such as a user's finger.

Note that each configuration of the tablet terminal 1 (1a) described above has a computer system therein. Then, a program for implementing the function of each component included in the tablet terminal 1 (1a) described above may be recorded on a computer-readable recording medium so that the program recorded on this recording medium is read into the computer system and executed to perform processing in each component included in the tablet terminal 1 (1a) described above. Here, the fact that "the program recorded on the recording medium is read into the computer system and executed" includes installing the program on the computer system. It is assumed that the "computer system" here includes the OS and hardware such as peripheral devices and the like.

Further, the "computer system" may include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the tablet terminal 1 (1a), or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the above-described functions may be realized as an integrated circuit such as LSI (Large Scale Integration). Each of the above-described functions may be implemented as a processor individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

What is claimed is:

1. A computer, comprising:
a display having a touchscreen; and
a processor coupled to the display, wherein the processor:
acquires a plurality of first detection positions on the touchscreen at a predetermined detection interval, each of the plurality of first detection positions corresponding to a respective touch operation on the touchscreen by an operation medium,
calculates a predictive position indicative of a predicted subsequent position of the operation medium based on the plurality of first detection positions,
corrects the predictive position based on a plurality of second detection positions and a correction weighting value, the plurality of second detection positions being a subset of the plurality of first detection positions selected at an interval greater than the predetermined detection interval, the correction weighting value being selected according to a correction index value based on a cosine value of an angle between at least latest three detection positions among the plurality of second detection positions, wherein when the correction index value is negative and smaller than a first threshold value of the correction weighting value, the processor selects a value corresponding to a case where no correction is performed, and outputs the predictive position without performing correction, and
displays, on the display, a trajectory line including the plurality of first detection positions and the corrected predictive position.

2. An information processing apparatus comprising:
a display;
a touch sensor placed on a screen of the display to detect a touch with an object on the screen;
an acquisition processing unit which acquires plural pieces of first detection position data on the screen detected by the touch sensor at predetermined detection intervals as a result of touching of an operation medium on the screen;
a prediction processing unit which generates predictive position data indicative of a predictive movement position of the operation medium, wherein the prediction processing unit executes:
prediction processing for generating the predictive position data indicative of the predictive movement position of the operation medium based on a predetermined number of second detection position data obtained by thinning out the plural pieces of first detection position data at two or more data intervals, selection processing for selecting a correction weighting value according to a correction index value based on a cosine value of an angle having, as a vertex, a second point of at least latest three points among the predetermined number of second detection position data, and correction processing for correcting the predictive position data based on the predetermined number of second detection position data including the latest three points and the weighting value, wherein when the correction index value is negative and smaller than a first threshold value in the selection processing, the prediction processing unit selects, as the correction weighting value, a value corresponding to a case where no correction is performed, and outputs the predictive position data without performing correction; and a display processing unit which displays, on the display, a movement trajectory on the screen as a result of touching and moving of the operation medium on the screen based on the first detection position data and the predictive position data output by the prediction processing unit.

3. The information processing apparatus according to claim 2, wherein when the correction index value is a negative value and equal to or more than the first threshold value in the selection processing, the prediction processing unit selects a larger value as the correction weighting value as the correction index value is larger.

4. The information processing apparatus according to claim 2, wherein when the correction index value is a negative value and equal to or more than a second threshold value larger than the first threshold value in the selection processing, the prediction processing unit does not execute the prediction processing, and the display processing unit displays, on the display, the movement trajectory without including the predictive position data.

5. The information processing apparatus according to claim 2, wherein the prediction processing unit generates the predictive position data based on Taylor series approximation in the prediction processing.

6. The information processing apparatus according to claim 2, wherein when a latest piece of first detection position data is added to the plural pieces of first detection position data, the display processing unit displays, on the display, the movement trajectory with the predictive position data replaced with the latest first detection position data.

7. A control method for an information processing apparatus including a display, and a touch sensor placed on a screen of the display to detect a touch with an object on the screen, the control method comprising:

causing an acquisition processing unit to acquire plural pieces of first detection position data on the screen detected by the touch sensor at predetermined detection intervals as a result of touching of an operation medium on the screen;

causing a prediction processing unit to execute:

prediction processing for generating predictive position data indicative of a predictive movement position of the operation medium based on a predetermined number of second detection position data obtained by thinning out the plural pieces of first detection position data at two or more data intervals, selection processing for selecting a correction weighting value according to a correction index value based on a cosine value of an angle having, as a vertex, a second point of at least latest three points among the predetermined number of second detection position data, and correction processing for correcting the predictive position data based on the latest three points in the predetermined number of second detection position data and the weighting value, wherein when the correction index value is negative and smaller than a first threshold value in the selection processing, the prediction processing unit selects, as the correction weighting value, a value corresponding to a case where no correction is performed, and outputs the predictive position data without performing correction; and causing a display processing unit to display, on the display, a movement trajectory on the screen as a result of touching and moving of the operation medium on the screen based on the first detection position data and the predictive position data output by the prediction processing unit.

* * * * *